(12) United States Patent
Wheeler et al.

(10) Patent No.: US 11,157,529 B1
(45) Date of Patent: Oct. 26, 2021

(54) IDENTIFYING INTEROPERABILITY STATUS BETWEEN DISCRETE COMPONENTS WITHIN A CONVERGED INFRASTRUCTURE SYSTEM

(71) Applicant: DELL PRODUCTS L.P., Round Rock, TX (US)

(72) Inventors: Jeffrey Wheeler, Holden, MA (US); Robin Sabi Rajan Bejgum, Bangalore (IN); Michael Parske, Canoga Park, CA (US); Dharmpal Singh Mukkar, Moga (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/882,417

(22) Filed: May 22, 2020

(51) Int. Cl.
*G06F 16/28* (2019.01)
*G06F 16/21* (2019.01)
*G06F 16/25* (2019.01)

(52) U.S. Cl.
CPC .......... *G06F 16/288* (2019.01); *G06F 16/212* (2019.01); *G06F 16/258* (2019.01)

(58) Field of Classification Search
CPC ..... G06F 16/288; G06F 16/212; G06F 16/258
USPC ........................................................ 707/756
See application file for complete search history.

(56) References Cited

U.S. PATENT DOCUMENTS

| | | | | |
|---|---|---|---|---|
| 2008/0120129 | A1* | 5/2008 | Seubert | G06Q 10/10 705/35 |
| 2010/0083232 | A1* | 4/2010 | Chouinard | G06F 21/10 717/124 |
| 2012/0259722 | A1* | 10/2012 | Mikurak | G06Q 50/12 705/26.1 |
| 2017/0308556 | A1* | 10/2017 | Gonzales-Brenes, Jr. | H04L 43/00 |
| 2019/0317776 | A1* | 10/2019 | Walsh | G06N 20/00 |

* cited by examiner

*Primary Examiner* — Dung K Chau
(74) *Attorney, Agent, or Firm* — North Weber & Baugh LLP

(57) ABSTRACT

Described herein are systems and methods for identifying the interoperability status between discrete components within a converged infrastructure system. One or more analyses of multiple datasets related to components or objects within the system are implemented, using the relationships that have been defined for the components, with the goal of determining the interoperability status of those components. The interoperability evaluation system comprises a request controller and an interoperability service module. The request controller receives a request of interoperability analysis from a user interface for a specified system configuration. The interoperability service module implements an interoperability analysis, with interactions with an element database and a customer profile database via an element DB API and an inventory common API respectively. Upon completion of the analysis, interop evaluation result is sent back to the user interface.

20 Claims, 9 Drawing Sheets

IDENTIFYING INTEROPERABILITY STATUS BETWEEN DISCRETE COMPONENTS WITHIN A CONVERGED INFRASTRUCTURE SYSTEM

COPYRIGHT NOTICE

A portion of the disclosure of this patent document contains material that is subject to copyright protection. The copyright owner has no objection to the facsimile reproduction by anyone of the patent document, as it appears in the Patent and Trademark Office patent file or records, but otherwise reserves all copyright rights whatsoever.

BACKGROUND

The present disclosure relates generally to information handling method and system. More particularly, the present disclosure relates to identifying interoperability status between discrete components.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a converged infrastructure system, groups multiple components are grouped into a single optimized computing package. Components of a converged infrastructure may include servers, data storage devices, networking equipment and software for IT infrastructure management, automation and orchestration. IT organizations use converged infrastructure to centralize the management of IT resources, to consolidate systems, to increase resource-utilization rates, and to lower costs. Converged infrastructures foster these objectives by implementing pools of computers, storage and networking resources that can be shared by multiple applications and managed in a collective manner using policy-driven processes. Interoperability implies exchanges between a range of products, or similar products from several different vendors, or even between past and future revisions of the same product. For discrete components, identifying their interoperability may enable the components to provide services to and accept services from each other, operate effectively together, exchange data via a common set of exchange formats, read and write the same file formats, and to use the same protocols, etc., in a system. For system owners, it is challenging to analyze hardware and software compatibility or interoperability of various components for one or more applications.

Accordingly, it is highly desirable to find new, more efficient ways to identify interoperability status between discrete components.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

Figure 1:
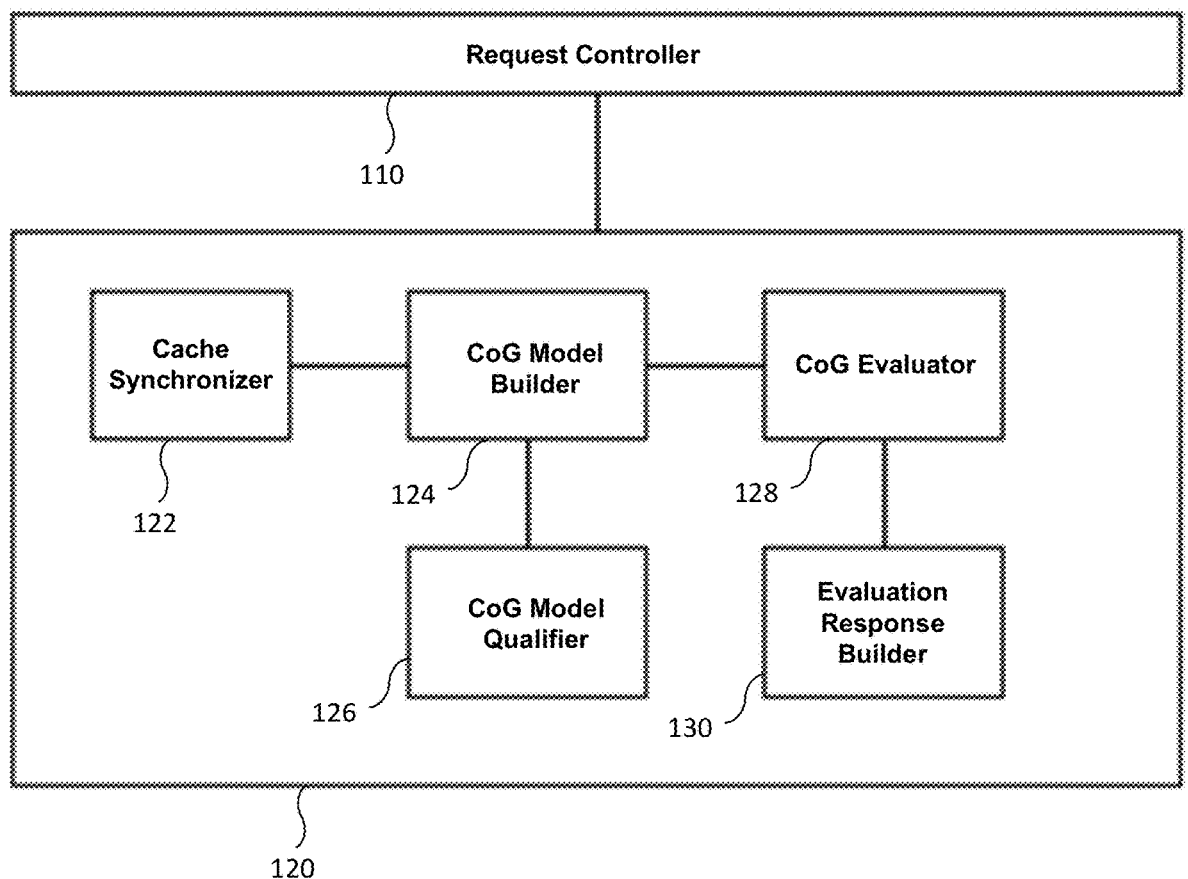
FIG. 1 ("FIG. 1") depicts high level architecture of interoperability design for converged infrastructure platforms, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any examples and codes provided herein are provided by way of illustration and were performed under specific conditions using a specific embodiment or embodiments; accordingly, neither these examples nor their codes shall be used to limit the scope of the disclosure of the current patent document.

It shall also be noted that although embodiments described herein may be within the context of a converged infrastructure system, aspects of the present disclosure are not so limited. Accordingly, the aspects of the present disclosure may be applied or adapted for use in other contexts.

A. Embodiments for Interoperability Request and Response

Interoperability implies exchanges between a range of products, or similar products from several different vendors, or even between past and future revisions of the same product. For discrete components, identifying their interoperability may enable the components to provide services to and accept services from each other, operate effectively together, exchange data via a common set of exchange formats, read and write the same file formats, and to use the same protocols, etc., in a system. For system owners, it is challenging to analyze hardware and software compatibility or interoperability of various components for one or more applications. Interoperability analyses or services have been implemented manually, which is time consuming and facing accuracy and efficiency challenging for large systems involving many hardware, software, and/or firmware components, especially when those systems upgrade or change configurations constantly. Embodiments of the present disclosure provide a new, more efficient ways to identify interoperability status and implement interoperability analysis between discrete components.

FIG. 1 depicts high level architecture 100 of interoperability design for converged infrastructure platforms, according to embodiments of the present disclosure. The architecture 100 comprises a request controller 110 and an interoperability service module 120. The request controller 110 receives a request of interoperability analysis for a specified system configuration, which may be represented by system identification (ID). The interoperability service module 120 couples to the request controller 110 and implements an interoperability analysis. In one or more embodiments, the interoperability service module 120 comprises modules including a cache synchronizer 122, a CoG model builder 124, a CoG model qualifier 126, a CoG evaluator 128, and an evaluation response builder 130. Details of each component of the interoperability service module 120 will be described in the following sections. In one or more embodiments, the interoperability service module 120 may be part of an interoperability service system 220, as shown in FIG. 2.

Figure 2:
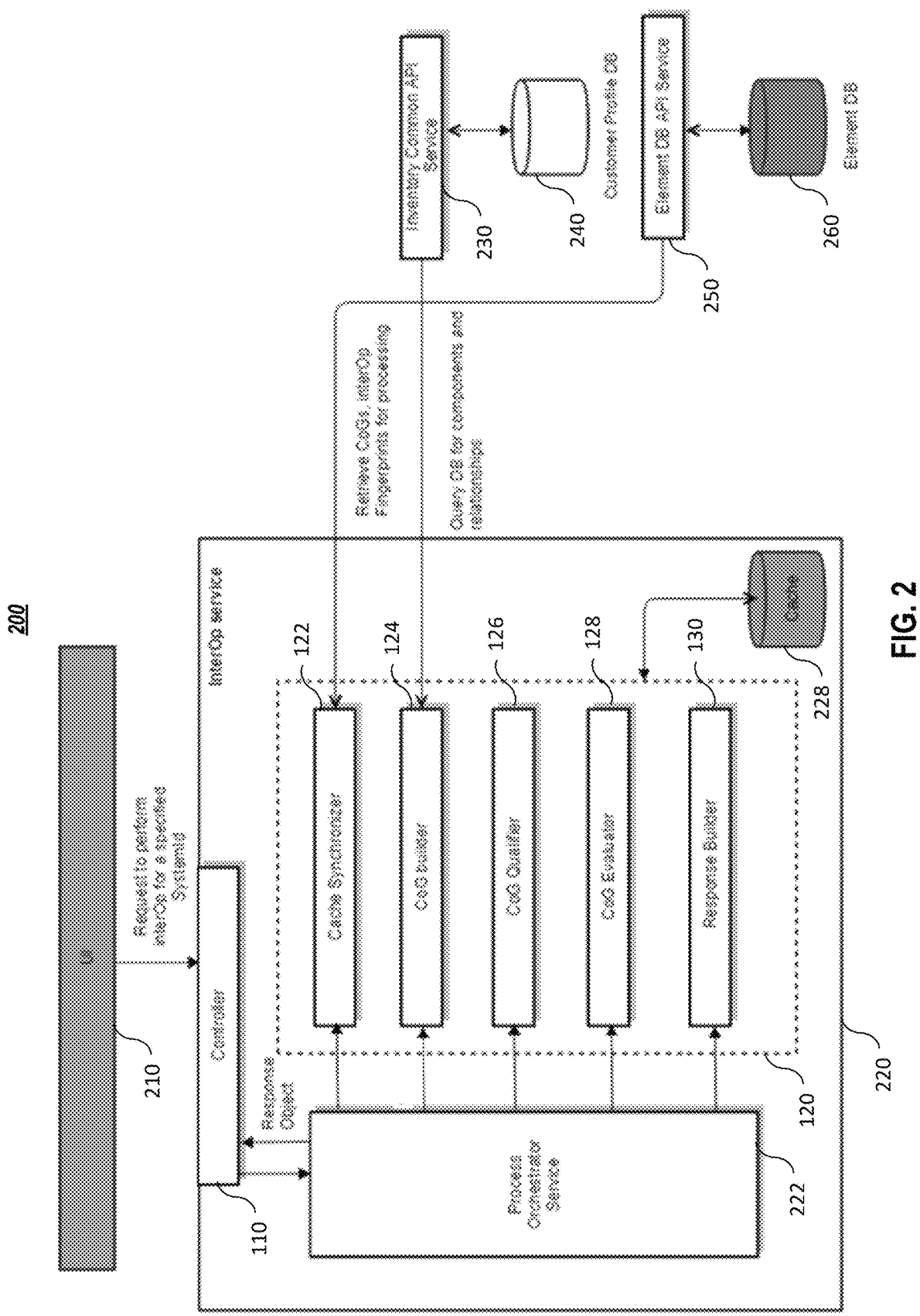
FIG. 2 depicts a module view for request and response flow, according to embodiments of the present disclosure.
Figure 3:
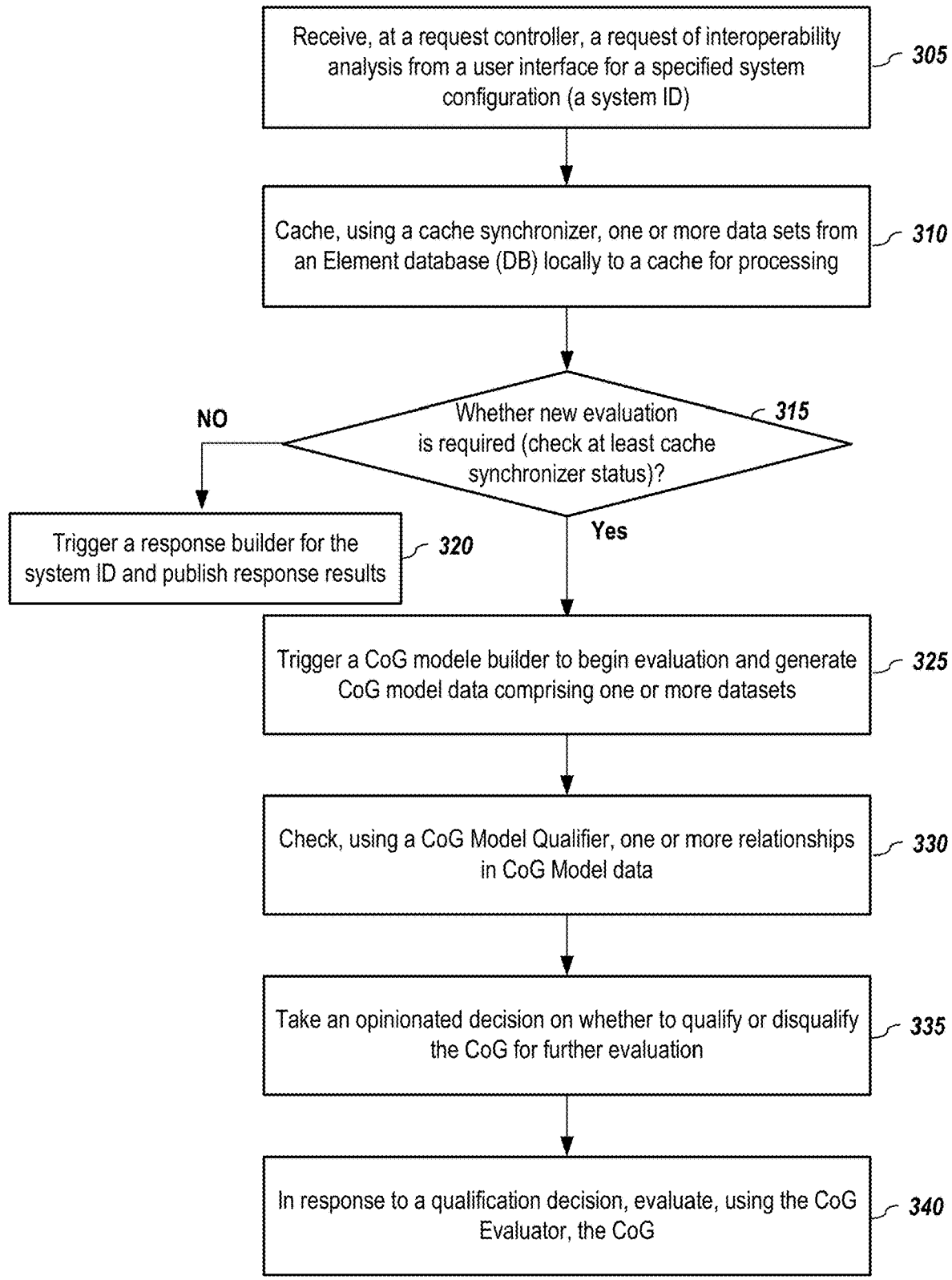
FIG. 3 depicts a process for request and response flow, according to embodiments of the present disclosure.

FIG. 2 depicts a module view 200 for request and response flow, according to embodiments of the present disclosure. FIG. 3 depicts a process for request and response flow corresponding to the module view as shown in FIG. 2, according to embodiments of the present disclosure. A request of interoperability analysis for a specified system configuration is received (305) at the request controller 110 from a user interface 210. In one or more embodiment, the specified system configuration may be represented by a system ID.

On start of the interop service, one or more data sets from an Element database (DB) 260 are cached (310) locally to a cache 228 for processing using a cache synchronizer 122. In one or more embodiments, the data sets may be retrieved from Element DB 260 via an element DB Application Programming Interface (API) and may comprise one or more CoGs and/or interoperability fingerprints for the one or more CoGs, etc. A fingerprint for a CoG may be referred as a unique identification for entire components in the CoG. In one or more embodiments, the cache synchronizer 122 performs tasks including checking the last synchronization data in an interoperability-data-synchronization (also referred as interop-data-sync) table, and/or refreshing data in the table. In one or more embodiments, data refreshing occurs on a periodical basis, e.g. once every week. During data refreshing, status of the table is updated to "In Progress" so that the interoperability (also referred as "interOp", "interop" or "INTEROP" hereinafter) evaluation request does not use old data. Upon data synchronization completion, status of the table is updated to "Complete." In one or more embodiments, the Element DB is created by incorporating data from multi-vendors into a universal format. In one or more embodiments, the Element DB is updated periodically, e.g. monthly, by need, or whenever new data emerged from one or more vendor.

In one or more embodiments, after retrieved data sets from Element DB cache locally, the cache has a flat structure (table with specific columns) per dataset to enable faster read for specific query. The columns may comprise CorrelatedGroups, InterOpFingerprints, InterOpRelationshipGroups, and/or Other data as needed.

In one or more embodiments, cache synchronizer status and last system evaluation time are checked (315), using a Process Orchestrator Service module 222, to decide whether new evaluation is required before proceeding with next steps. For system evaluation time checking, system serial number and map may be used for checking against system inventory synchronization time to decide whether new evaluation is required or data in cache is used. In response to evaluation not required, a response builder module 130 is triggered (320) for the system ID (e.g. System Serial Number) and response results are published. In response to evaluation required, a CoG model builder 124 is triggered (325) to begin evaluation and generate CoG model data comprising one or more datasets.

In one or more embodiments, the CoG model builder module 124 performs at least one of the following for evaluation:

reading interop-relationship-groups from cache of type "INTEROP_RELATIONSHIPS_GROUP";

for each interop-relationship-group, if "memberComponentGroups" is not empty, reading the associated member component groups; and retrieving data from a Customer Profile Database 240 via an inventory common API service 230.

In one or more embodiments, retrieving data from the Customer Profile Database may comprise using the "PrimaryComponent" column value and System Serial number to get all components in the retrieved CoG. For example, a code of Get(USNC105389GLB, COMPUTE_SERVER): List<COMPUTE_SERVER> PrimaryComponentType of HARDWARE may provide an object with minimal properties like part number, serial number, firmware version, etc. In another example, a code of PrimaryComponentType of SOFTWARE may provide an object with minimal properties like name, software version, etc.

In one or more embodiments, retrieving data from the Customer Profile Database may also comprise iterating through List<Component> retrieved in previous step and applying relationships from the retrieved CoG to get associated component details, building CoG model data structure and populating status of relationship data for connected components. In one or more embodiments, Tenant Id and System Serial Number may be used to separate data, which is critical to avoid using the cross customer data. In one or more embodiments, the CoG model data structure may be shown as Component Unique Id→Serial Number for Hardware, Name for Software Component Id→Part Number for Hardware, Name for Software Target Component Id→Part Number for Hardware, Name for Software, or Component Group Instance Id→Unique Id generated for the CoG applied on top of a dataset of components applicable for interOp. For example, for a given System having 5 servers, a CoG Model may be built for 5 datasets with each dataset having a server and associated components in it. In one or more embodiments, this unique Id may be a hashcode for the dataset and later used to map the qualifier status.

In one or more embodiments, retrieving data from the Customer Profile Database may also comprise sending the CoG Model data (e.g. for each server) for qualification.

In one or more embodiments, a CoG Model Qualifier 126 checks (330) one or more relationships in CoG Model data and takes (335) an opinionated decision on whether to qualify or disqualify the CoG (e.g. the Server) for further evaluation. In one or more embodiments, disqualification may be made when a certain relationship expected by PrimaryComponent as mandatory for fingerprint is not found in database. In one or more embodiments, disqualified PrimaryComponents are considered by the Response Builder Module 130 to notify the UI 210 with a disqualification response. Qualification of the CoG model for a given PrimaryComponent may be based on whether all relationships are satisfied. Qualification of the CoG model for a given PrimaryComponent may be based on whether all mandatory relationships are satisfied. In an example, when a C-Series server in a sample able doesn't have a target component expected by default by the interOp relationships components. In this case the CoG model qualifier 126 may try to identify the component and apply ignore "missing relationship" rule. A CoG model for the C-Series server may then be qualified for evaluation. Table 1 below shows examples of qualified CoG name and instance.

TABLE 1

Qualified CoG name and instance examples

| ComponentGroupName | ComponentGroupInstanceId | Is Qualified | Qualified Date |
|---|---|---|---|
| COMPANY_X-HCL-SOFTWARE-INTEROP | FCH18387ZCR | true | |
| COMPANY_X-HCL-SOFTWARE-INTEROP | KSR18387ZAB | true | |

In one or more embodiments, in response to a qualification decision from the CoG qualifier 126, the process proceeds for evaluation (340) using the CoG Evaluator 128. the CoG Model data may comprise more than one CoG instance of some components like driver, adapter, processor, etc. Unique sets of the CoG model are created for evaluation. For example, a CoG model (e.g. a B-series sever) may be split into multiple data sets with each dataset having only one instance of each component.

Figure 4:
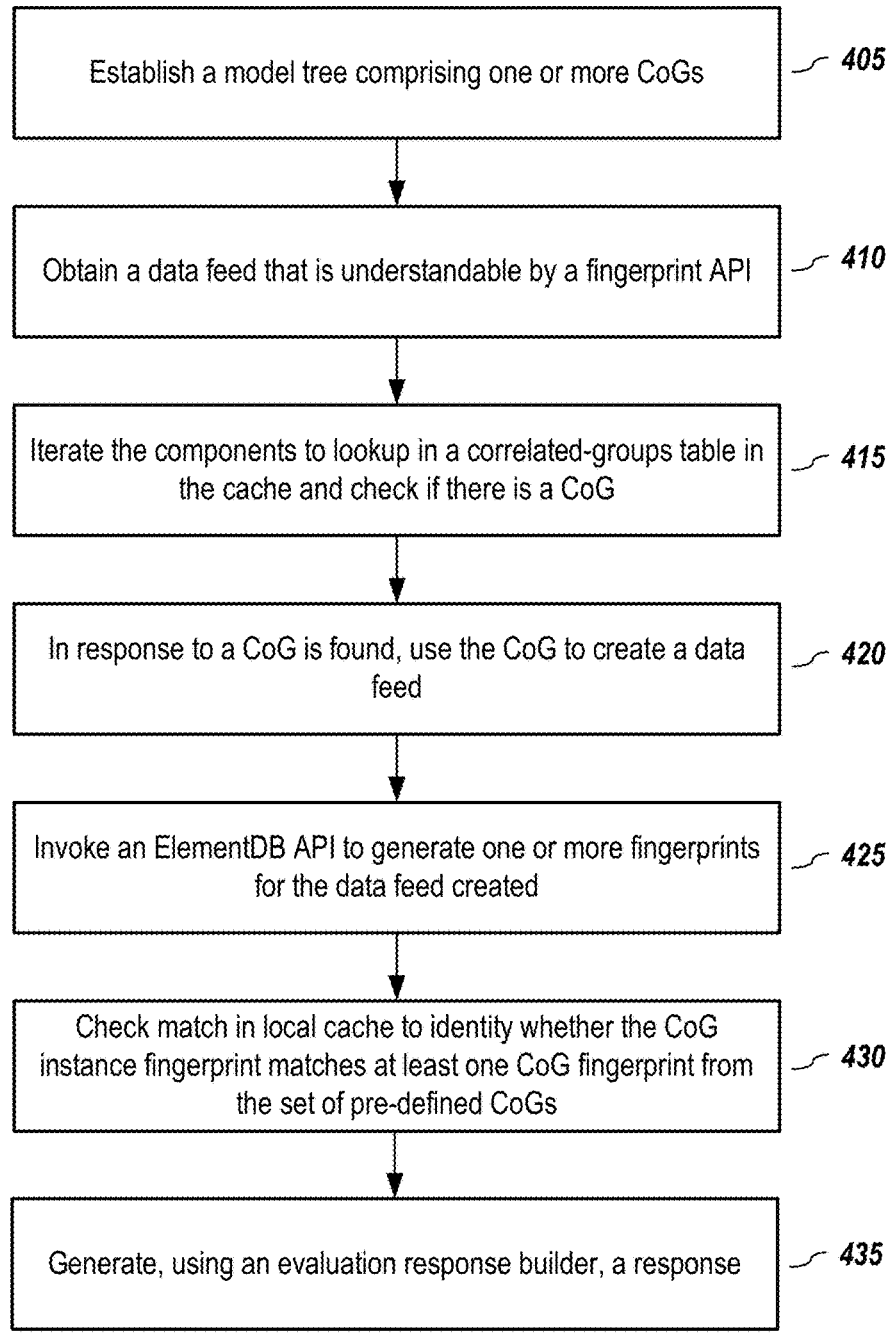
FIG. 4 depicts a process for component group (CoG) evaluation, according to embodiments of the present disclosure.
Figure 5:
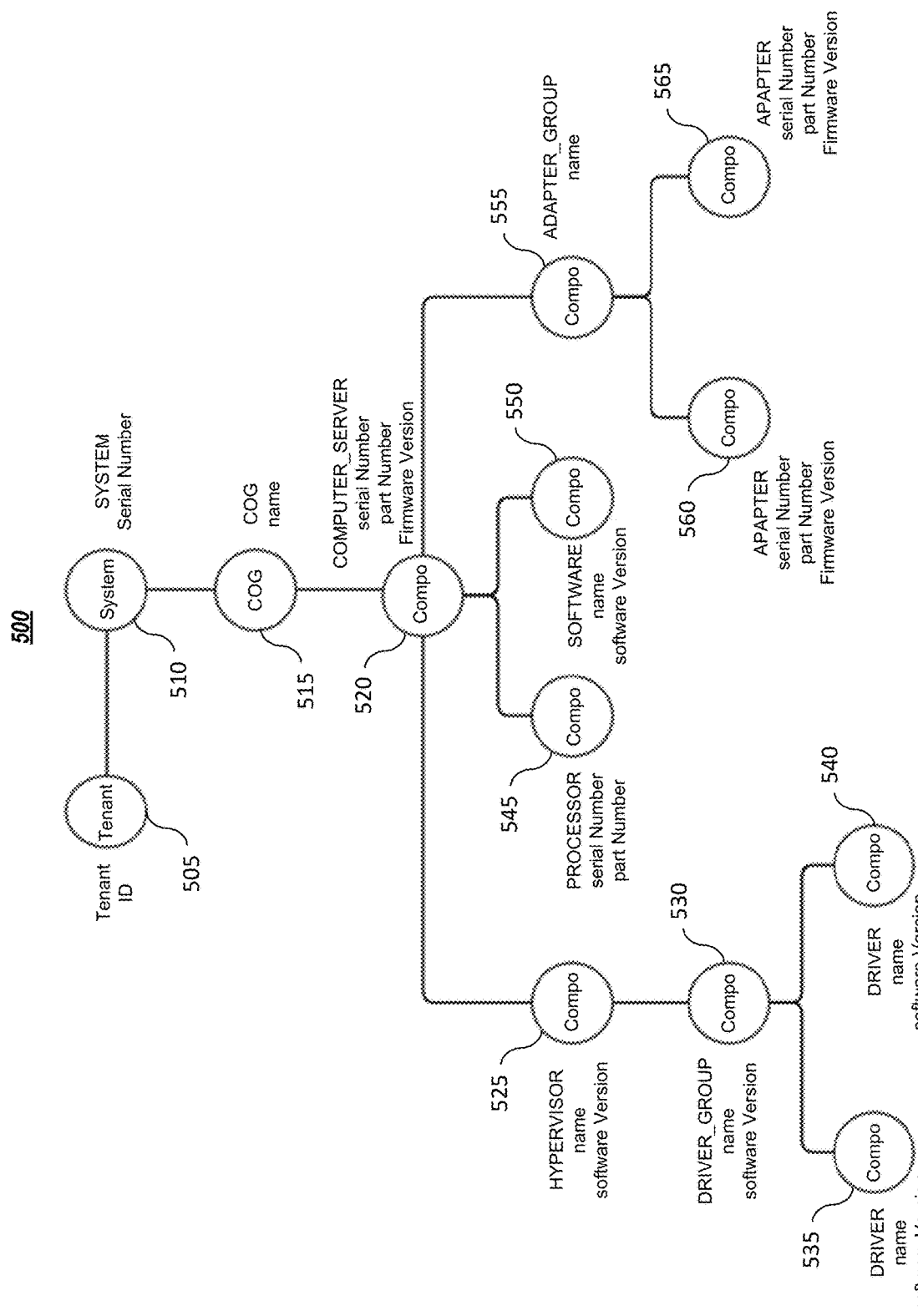
FIG. 5 graphically depicts a model tree for CoG evaluation, according to embodiments of the present disclosure.

FIG. 4 depicts a process for CoG evaluation, according to embodiments of the present disclosure. A model tree is established (405) during the evaluation. FIG. 5 graphically depicts an exemplary model tree having a structure of Tenant (or user) 505→System 510→Applied CoGs 515→Components in CoG 520~565. In one or more embodiments, components (shown as "Compo" in FIG. 5) in the CoG may be a computer server component 520 with serial number, part number and firmware version, a software component 525 (under the computer server component 520) with a hypervisor version, a driver group component 530 (under the software component 525) with software version, a driver component 535 or 540 (under the driver group component 530), a processor component 545 (under the computer server component 520) with serial number and part number, a software 550 (under the computer server component 520) with software version, an adapter group 555 (under the computer server component 520), an adapter 560 or 565 (under the adapter group 555) with adapter serial number, part number and firmware version. In one or more embodiments, a hypervisor is software that is used in the creation and operation of virtual machines; a hypervisor may include and integrate operating system components.

With the established model tree, a data feed that is understandable by a fingerprint API may be obtained (410). In one or more embodiments, the fingerprint API may be generated using methodology shown in Table 2, below.

TABLE 2

Methodology for Generating a Fingerprint

```
[
{
"entityType":"COMPONENTGROUP",
"subType":"COMPUTE_SERVER",
"componentId":"<name>",
"componentVersion":"<firmwareVersion>",
"relComponents":
[
{
"entityType":"ADAPTER",
"subType":"CNA",
"componentId":"<partNumber>",
"componentVersion":"<firmwareVersion>",
"relComponents":
[
]
},
{
"entityType":"ADAPTER",
"subType":"CNA",
"componentId":"<partNumber>",
"componentVersion":"<firmwareVersion>",
"relComponents":
[
]
}
]
},
{
"entityType":"SOFTWARE_COMPONENT",
"subType":"SOFTWARE",
"componentId":"<name>",
"componentVersion":"<softwareVersion>",
"relComponents":
[ ]
},
{
"entityType":"SOFTWARE_COMPONENT",
"subType":"HYPERVISOR VERSION",
"componentId":"<name>",
"componentVersion":"<softwareVersion>",
"relComponents":
[
{
"entityType":"COMPONENT_DRIVER",
"subType":"NFNIC",
"componentId":"name",
"componentVersion":"<driverVersion>",
"relComponents": []
},
{
"entityType":"COMPONENT_DRIVER",
"subType":"NENIC",
"componentId":"name",
"componentVersion":"<driverVersion>",
"relComponents": []
}
```

TABLE 2-continued

Methodology for Generating a Fingerprint

```
]
},
{
"entityType":"COMPONENTGROUP",
"subType":"PROCESSOR",
"componentId":"<name>",
"componentVersion":"<firmwareVersion>",
"relComponents":
[ ]
}
]
```

Although the methodology shown in Table 2 is created using JavaScript Object Notation (JSON), one skilled in the art shall understand the methodology may also be implemented using scripts other than JAVA, such implementations shall be within the scope of this invention disclosure.

In one or more embodiments, the components are iterated (415) through to lookup in the correlated-groups table, which is one of the tables retrieved from the Element DB, in the cache and check if there is a matching CoG. If found, the CoG is used (420) to create a data feed in JSON, e.g. use ComponentGroup as entityType in the JSON and subtype as current componentType.

It has been found that many times, versions and names (software) are not harmonized and different data sources treat them differently. In one or more embodiments, while iterating through the correlated-groups table, version and name for each component are reviewed to check for any CoG association. If found, current values are replaced with values found in cache.

In one or more embodiments, an Element DB API is invoked (425) to generate one or more fingerprints for the data feed created. Match in local cache for fingerprint is checked (430) to identity whether the CoG instance fingerprint matches at least one CoG fingerprint from the set of pre-defined CoGs. If one or more match results are found, they are persisted along with the date time of operation.

In one or more embodiments, the UI may understand interop evaluation status in terms of issues. For example, a response with 0 memberObjects would mean the interOp evaluation is successful and no issues are found.

Based on match results (matched fingerprints and/or component sets without matched fingerprints), a response is generated (440) using the evaluation response builder 130. When one or more matches are found, the response designates the CoG instance is a valid configuration and the response may further comprise the one or more matches. When no match is found, the response designates the CoG instance is an invalid configuration.

In one or more embodiments, the response may have the following structure shown in Table 3.

TABLE 3

An Exemplary Response

```
{
memberCount:1,
members:[ // Table in the UI
{ // Row
[ // Each entry/line in the row represents a component
{ // Component Details
"ComponentName":"",
"ComponentId":"",
"ComponentVersion":""
```

TABLE 3-continued

An Exemplary Response

```
},
{
"ComponentName":"",
"ComponentId":"",
"ComponentVersion":""
}
]
}
]
}
```

B. Embodiments of Interoperability Service

In one or more embodiments, inter-Operability features may provide services to satisfy one or more requirements of a customer. The requirements may comprise system level inter-operability tested as a system (TaaS), inter-Operability between set of components based on vendor Hardware Compatibility List (HCL), and/or inter-Operability between set of components custom selected by the user.

Figure 6:
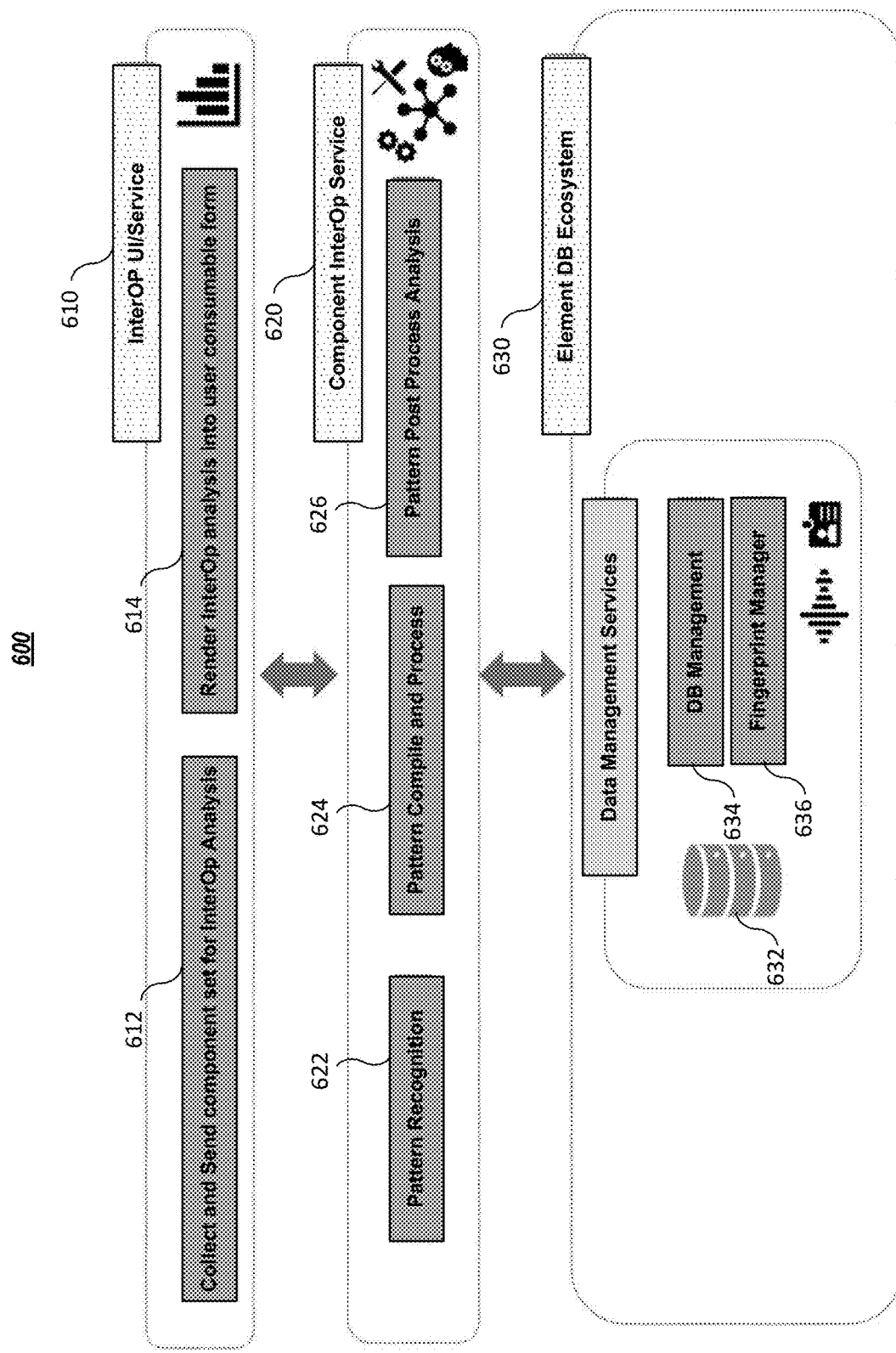
FIG. 6 depicts graphically a flow for interoperability services, according to embodiments of the present disclosure.

FIG. 6 depicts graphically a flow for interoperability services, according to embodiments of the present disclosure. In an interOp user interface (UI) 610, information of a component set may be collected and sent (612) to an interOp service system 620 for interOp analysis, or interOp analysis is rendered (614) from the interoperability service system 620 into a user consumable (or UI understandable) form for user review. In one or more embodiments, the interOp service system 620 may comprise one or more components of the interoperability service system 220 shown in FIG. 2 to perform desired interOp service.

In one or more embodiments, the interoperability service system 620 comprises an interOp pattern recognition module 622, a pattern compile and processing module 624, and a pattern post process analysis module 626 for component set interoperability evaluation. In one or more embodiments, a component interOp pattern may be referred as a unique set of components that are qualified to participate in a component interoperability process. They may be stored in the Element DB as CoGs.

Figure 7:
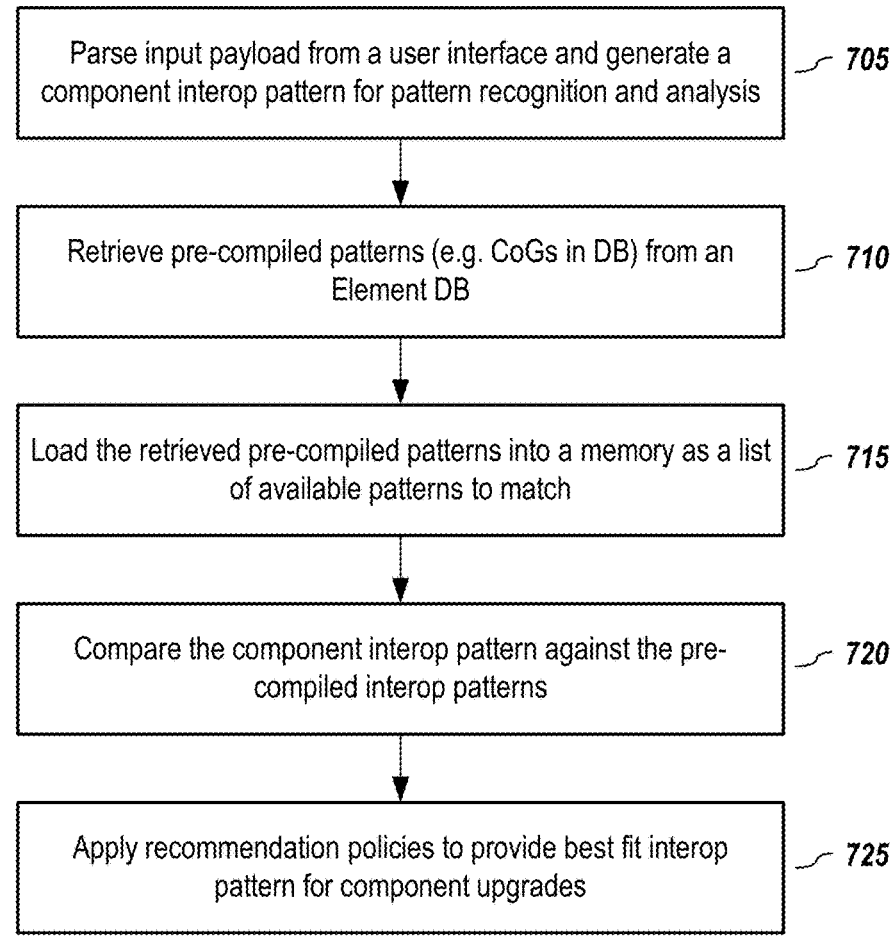
FIG. 7 depicts a process for component set interoperability evaluation, according to embodiments of the present disclosure.

FIG. 7 depicts a process for component set interoperability evaluation, according to embodiments of the present disclosure. The pattern recognition module 622 parses (705) input payload from the UI 610 and generate a component interop pattern for pattern recognition and analysis. The pattern compile and processing module 624 retrieves (710) pre-compiled patterns (also-known-as CoGs in DB) from the Element DB 632 and loads (715) the retrieved pre-compiled patterns into a memory as a list of available patterns to match. In one or more embodiments, representation of an interOp pattern is a set of components in the memory. The pattern compile and processing module 624 further compares (720) the component interop pattern against the pre-compiled interop patterns. The pattern post process analysis module 626 applies (725) recommendation policies to provide best fit interop pattern for component upgrades.

In one or more embodiments, the comparison between the input interop pattern against pre-compiled interop patterns comprises: identifying pre-compiled patterns that fully match the input pattern; identifying pre-compiled patterns that partially match the input pattern and ranking these pre-compiled patterns according to match percentage; for matched pre-compiled patterns (full or partial), identifying the vendor who authorized the pattern; for each fully matched pre-compiled pattern, scanning each authorized vendor interop fingerprints to figure out a match for input interop pattern; and for each partially matched pre-compiled pattern, scanning each authorized vendor interop fingerprints to find the delta in fingerprint match. In one or more embodiments, component versions may be used to generate a fingerprint.

In one or more embodiments, the flow for interoperability services involves an element DB Ecosystem 630, which comprises a fingerprint management module (or fingerprint manager) 634 and an element DB management API 636 for data management services. The fingerprint management module 634 provides end points to manage (e.g. CRUD referred as Create, Read, Update, Delete) component interop fingerprints. The element DB management API 636 provides end points for Element DB entity management (CRUD). In one or more embodiments, the fingerprint management module 634 uses element DB management API where required.

In one or more embodiments, the element DB 632 is an open-source relational database, e.g. PostgreSQL, storing one or more tables including inter-op-request table, inter-op-component table, inter-op-context table, inter-op-allowed-relationships table, inter-op-component-allowed-relationship table, etc. Tables 4-9 show exemplary tables stored in the element DB 632 according to one or more embodiments.

TABLE 4

Inter-op-request

| Column Name | Type | Description |
| --- | --- | --- |
| SystemId | String | Serial Number of the System |
| InterOpType | String | TAAS \| VHCL \| CUSTOM |
| InterOpComponentData | String | JSON String of Component Collection |
| InterOpRequestHash | String | Hash the request component set for same request comparison in case of CUSTOM type interOp. |
| InterOpFingerPrint | String | Unique fingerprint is returned by Element DB Service API for a given set of components |
| CreatedOn | DateTime | |

TABLE 5

Inter-op-component

| Column Name | Type | Description |
| --- | --- | --- |
| componentType | String | Unique in the table. Type of component. Example: COMPUTE_SERVER, SWITCH, VIC etc |
| aliasName | String | |
| CreatedOn | DateTime | |

TABLE 6

Inter-op-context

| Column Name | Type | Description |
| --- | --- | --- |
| contextType | String | Unique in the table. TAAS\|VHAL\|CUSTOM |
| CreatedOn | DateTime | |

TABLE 7

Inter-op-allowed-relationships

| Column Name | Type | Description |
| --- | --- | --- |
| relationship-Name | String | Unique name for set of associated relationship types. |
| relationships | String | Comma Separated relationship names that must be queried for associated component in inter-op-component table. Customer profile database must have all the required relationships.<br>Example A:<br>A ComputeServer must have following relationships data to participate in VHCL interOp. MANAGED_BY, CONTAINS, RUNNING_OPERATING_ENVIRONMENT, FIRMWARE<br>Example B:<br>A ComputeServer must have following relationships data to participate in TAAS interOp. MANAGED_BY, CONTAINS, FIRMWARE |
| CreatedOn | DateTime | |

TABLE 8

Inter-op-component-context-relationship

| Column Name | Type | Description |
| --- | --- | --- |
| componentType | String | Type of Component as in inter-op-component table Example: COMPUTE_SERVER, SWITCH, VIC etc |
| contextType | String | Name as in inter-op-allowed-relationships table |
| name | String | Example: PARTICIPATES_IN_INTEROP_CONTEXT |
| CreatedOn | DateTime | |

In one or more embodiments, Table 8 is queried to understand what components participate in the interOp relationships in a given context of TAAS|VHAL|CUSTOM.

TABLE 9

Inter-op-component-allowed-relationship

| Column Name | Type | Description |
| --- | --- | --- |
| componentType | String | Type of Component as in inter-op-component table Example: COMPUTE_SERVER, SWITCH, VIC etc. |
| contextType | String | Name as in inter-op-context table |
| allowedRelationships | String | relationshipName value as-in inter-op-allowed-relationships table. TAAS|VHAL|CUSTOM |
| CreatedOn | DateTime | |

In one or more embodiments, one or more constraints may be applied for tables in the element DB 632. For example, ComponentType may need to be in CAPS. ComponentType may be unique in the table and not be null. ContextType may need to be in CAPS. ContextType may be unique in the table and not be null. RelationshipName may need to be unique in the table and not be null. Relationships may not be null. ComponentType and ContextType may need to be considered as a combination key. AllowedRelationships may need to be not null.

In one or more embodiments, to perform interoperability analysis, interOp service may need to understand the request parameters and collect data related to all the components that participate in the specific interOp option (TAAS/VHCL/CUSTOM). As a customer inventory database has all the required detailed about System, components and relationships between the components, interOp service may get the data from a Customer Inventory Database. In one or more embodiments, interOp Service may query Global Data Services (GDS) directly or request a Common Data API to retrieve information.

Figure 8:
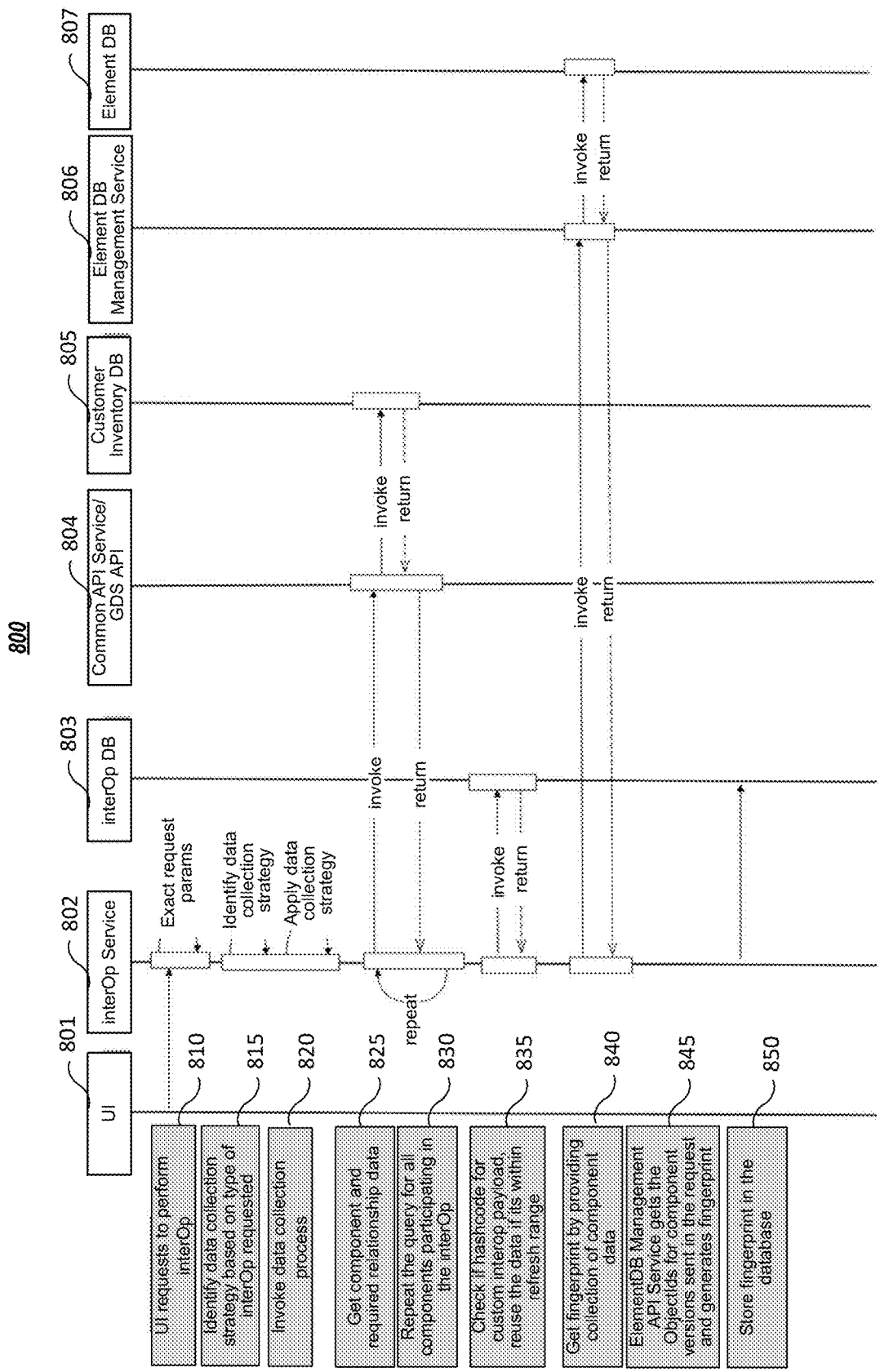
FIG. 8 graphically depicts flow for interoperability request and data collection, according to embodiments of the present disclosure.

FIG. 8 graphically depicts flow for interoperability request and data collection, according to embodiments of the present disclosure. A request for interoperability service is sent (810) from the UI 801 to the interOp service system 802. The interOp service system 802 then identifies (815) data collection strategy based on type of the interOp request and invokes (820) a data collection process based on the identified data collection strategy. In one or more embodiments, the data collection process comprises getting (825) component and required relationship data from a customer inventory database 805 via a common API service or GDS API 804, and repeating (830) a query for all components participating in the interOp. The interOp service system 802 further checks (835) if hashcode for customer interOp payload is within an interOp database 803 and reuses found hashcode if the found hashcode is within a refresh range. The interOp service system 802 then provides collection of component data to an element DB management service module 806 to get (840) one or more fingerprints. In one or more embodiments, the element DB Management API Service gets (845) Object IDs for component versions sent in the request from an element DB 807 and generates one or more fingerprints, which are then stored into the interOp database 803.

C. Some Methodology Embodiments

In this section, one or more methodology embodiments are disclosed for implementing certain processes described above. The methodology embodiments may be described using a certain format. One skilled in the art shall understand that the implementations may also be performed in other formats. Such variations shall also be within the scope of this invention.

1. Pattern Recognition Based on Input Payload

In one or more embodiments, an input Payload (or a specified system configuration) may comprise components, versions, associations between the components. A pattern recognition procedure identifies the payload, extracts the components and versions to create an interOp pattern to match against pre-compiled interOp patterns in the Element DB.

Table 10, Table 11, and Table 12 respectively show payload and interOp pattern for server only payload type, virtualization only payload type, and server and virtualization payload type, according to one or more embodiments of the present disclosure. The interOp intent for table 10 is to check if the Server and its associated components are at the firmware/software levels that are supported for interoperability, while interOp intent for table 11 is to check if the hypervisor version and virtual machine (VM) management utility are at software version levels that are supported for interoperability.

TABLE 10

Payload and interOp pattern for server only payload type

| Payload | InterOp Pattern |
|---|---|
| {<br>"serverCollection":<br>[<br>{<br>"serverType":"B-Series",<br>"model":"COMPANY_X SOFTWARE B200 M3",<br>"partNumber":"SOFTWARE-B200-M3",<br>"firmwareVersion":"4.0(2)",<br>"managementType":"SOFTWARE",<br>"managedBy": {"name":"SOFTWARE","version":"4.0(2)"},<br>"associatedComponents":<br>{<br>"processor":{"name:"Intel Xeon E5-2600 Series processors",<br>"partNumber":"", "family":"E5-2600", "firmwareVersion":""},<br>"operatingEnvironment": {"name":"Hypervisor", "version": "<br>Hypervisor version", "managedBy":{"name":"VM management",<br>"version": "6.6"}},<br>"adapters": {"cna": {"vic":{"model":"SOFTWARE 1240 Virtual<br>Interface Card (COMPANY_X)",<br>"partNumber":"SOFTWAREB-VIC-M83-8P",<br>"firmwareVersion":"4.3(2)",<br>"nenic":{"driverVersion":"1.6.0.47 Fibre Channel",<br>"adapterBios":"<none+22"},<br>"fenic":{"driverVersion":"1.6.0.47 Fibre Channel",<br>"adapterBios":"<none>"}<br>}<br>}<br>}<br>}<br>}<br>] | SOFTWARE<br>SOFTWARE-B200-M3<br>Intel Xeon E5-2600<br>Series processors<br>Hypervisor version<br>SOFTWAREB-VIC-M83-8P<br>VM management<br>version |

TABLE 11

Payload and interOp pattern for virtualization only payload type

| Payload | InterOp Pattern |
|---|---|
| {<br>"virtualizationCollection"<br>[<br>{<br>"name":"Hypervisor",<br>"version":"Hypervisor version",<br>"managedBy":{"name":"VM management", "version": "x.x"}<br>]<br>} | Hypervisor version<br>VM management version |

In Table 12, the interOp intent is to check if the server and its associated components, operating environment on server and its managing software are at the firmware/software levels that are supported for interoperability. In or more embodiments, even though the Hypervisor and VM management components are present in the payload as a separate elements, interOp pattern recognition may give preference to the similar components that are provided as associated components to the server. In case the operating environment details are not provided in the payload, Hypervisor and VM management may be picked from the Virtualization section.

TABLE 12

Payload and interOp pattern for sever and virtualization payload type

| Payload | InterOp Pattern |
|---|---|
| {<br>"serverCollection": [<br>{<br>"serverType":"B-Series", "model":"COMPANY_X SOFTWARE B200 M3",<br>"partNumber":"SOFTWARE-B200-M3", "firmwareVersion":"4.0(2)",<br>"managementType":"SOFTWARE",<br>"managedBy":{"name":"SOFTWARE","version": "4.0(2)"}, | SOFTWARE<br>SOFTWARE-B200-M3<br>Intel Xeon E5- 2600<br>Series processors<br>Hypervisor version<br>SOFTWAREB-VIC-M83-8P<br>VM management<br>version |

TABLE 12-continued

Payload and interOp pattern for sever and virtualization payload type

| Payload | InterOp Pattern |
|---|---|
| "associatedComponents":{<br>"processor": {"name":"Intel Xeon E5-2600 Series processors",<br>"partNumber":"", "family":"E5-2600", "firmwareVersion":""},<br>"operatingEnvironment":{"name":" Hypervisor",<br>"version":"Hypervisor version", "managedBy":{"name": "VM<br>management", "version": "x.x"}},<br>"adapters": {"cna": {"vic":{<br>"model":"SOFTWARE 1240 Virtual Interface Card<br>(COMPANY_X)",<br>"partNumber":"SOFTWAREB-VIC-M83-8P",<br>"firmwareVersion":"4.3(2)",<br>"nenic":{"driverVersion":"1.6.0.47 Fibre Channel",<br>"adapterBios":"<none>+56,<br>"fenic":{"driverVersion":"1.6.0.47 Fibre Channel",<br>"adapterBios":"<none>"}<br>}<br>}<br>}<br>+56,<br>"virtualizationCollection" [{"name":"Hypervisor",<br>"version":"Hypervisor version", "managedBy":{"name": "VM<br>management", "version": "VM management version"} ]<br>]<br>} | |

D. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 9:
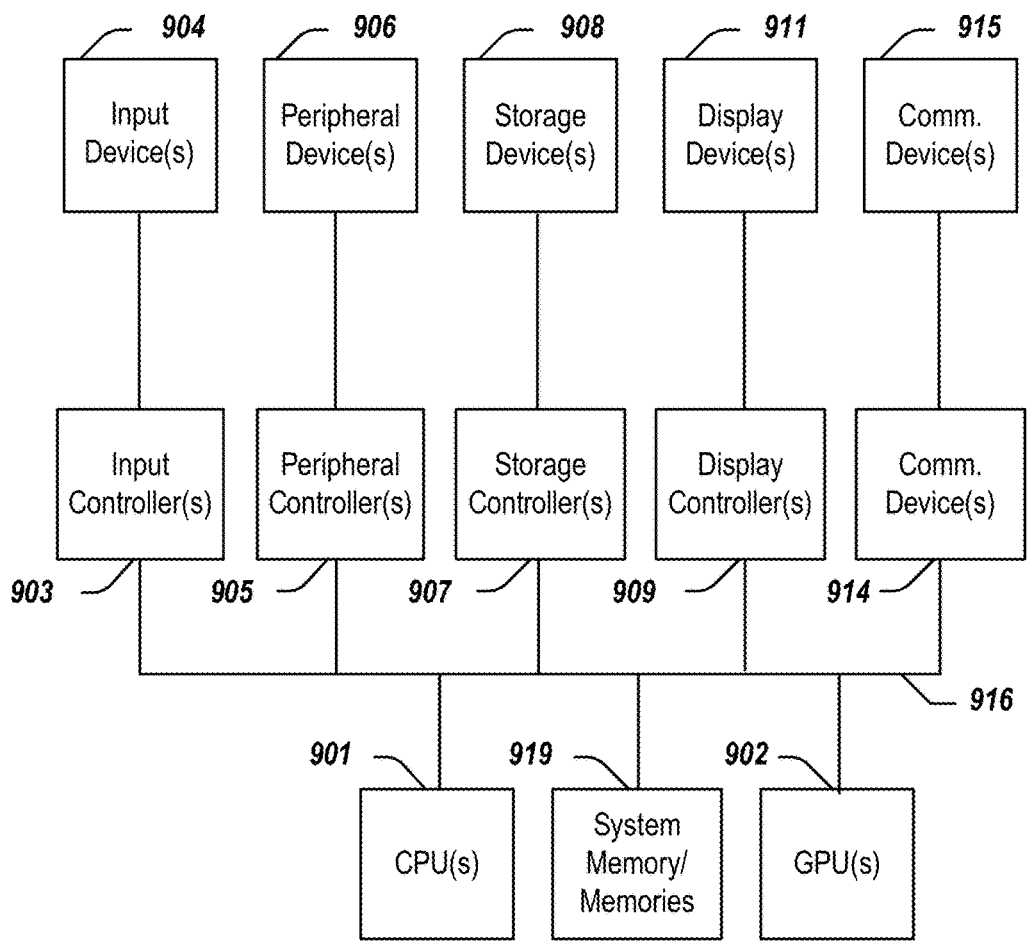
FIG. 9 depicts a simplified block diagram of an information handling system according to embodiments of the present invention.

FIG. 9 depicts a simplified block diagram of an information handling system (or computing system) according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more central processing units (CPU) 901 that provides computing resources and controls the computer. CPU 901 may be implemented with a microprocessor or the like, and may also include one or more graphics processing units (GPU) 919 and/or a floating-point coprocessor for mathematical computations. In one or more embodiments, one or more GPUs 919 may be incorporated within the display controller 909, such as part of a graphics card or cards. System 900 may also include a system memory 902, which may be in the form of random-access memory (RAM), read-only memory (ROM), or both.

A number of controllers and peripheral devices may also be provided, as shown in FIG. 9. An input controller 903 represents an interface to various input device(s) 904, such as a keyboard, mouse, touchscreen, and/or stylus. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present disclosure. Storage device(s) 908 may also be used to store processed data or data to be processed in accordance with the disclosure. The system 900 may also include a display controller 909 for providing an interface to a display device 911, which may be a cathode ray tube (CRT), a thin film transistor (TFT) display, organic light-emitting diode, electroluminescent panel, plasma panel, or other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for interoperability service comprising:
receiving a request for interoperability service for a specified system configuration comprising a set of components;
retrieving a set of pre-defined component groups (CoGs) from an element database, in which a CoG defines a set of fields of data related to a set of one or more components and one or more relationships between components;
generating CoG model data comprising one or more CoG instances based on the specified system configuration; and
for each CoG instance:
responsive to the CoG instance determined to be disqualified for evaluation, noticing a user with a disqualification response; and
responsive to the CoG instance determined to be qualified for evaluation:
establishing a model tree for the CoG instance;
generating a CoG instance fingerprint based on the established model tree;
iterating the set of pre-defined component groups to identity whether the CoG instance fingerprint matches at least one CoG fingerprint from the set of pre-defined CoGs; and
generating an evaluation response based on a result of the match identification.

2. The computer-implemented method of claim 1 wherein the element database is created by incorporating data from multi-vendors into a universal format.

3. The computer-implemented method of claim 1 wherein the retrieved set of pre-defined CoGs is cached locally.

4. The computer-implemented method of claim 1 wherein the specified system configuration comprises the set of components, versions, and associations between the set of components.

5. The computer-implemented method of claim 1 wherein the generating CoG model data comprises retrieving data from a customer profile database and populating status of relationship data for connected components.

6. The computer-implemented method of claim 1 wherein the model tree has a structure comprising a user, system, applied CoG, component in the applied CoG.

7. The computer-implemented method of claim 1 wherein the CoG instance is determined to be disqualified for evaluation when a mandatory field is not found for the CoG instance, wherein the CoG instance is determined to be qualified for evaluation when each mandatory field is found for the CoG instance.

8. The computer-implemented method of claim 1 wherein:
responsive to the CoG instance fingerprint matching at least one CoG fingerprint from the set of pre-defined CoGs that represent valid configurations, the evaluation response designates the CoG instance as a valid configuration; and
responsive to the CoG instance fingerprint not matching any CoG fingerprint from the set of pre-defined CoGs that represent valid configurations, the evaluation response designates the CoG instance as an invalid configuration.

9. A non-transitory computer-readable medium or media comprising:
one or more sequences of instructions which, when executed by one or more processors, causes steps to be performed comprising:
receiving a request for interoperability service for a specified system configuration comprising a set of components;
retrieving a set of pre-defined component groups (CoGs) from an element database, in which a CoG defines a set of fields of data related to a set of one or more components and one or more relationships between components;
generating CoG model data comprising one or more CoG instances based on the specified system configuration; and
for each CoG instance:
responsive to the CoG instance determined to be disqualified for evaluation, noticing a user with a disqualification response; and
responsive to the CoG instance determined to be qualified for evaluation:
establishing a model tree for the CoG instance;
generating a CoG instance fingerprint based on the established model tree;
iterating the set of pre-defined component groups to identity whether the CoG instance fingerprint matches at least one CoG fingerprint from the set of pre-defined CoGs; and
generating an evaluation response based on a result of the match identification.

10. The non-transitory computer-readable medium or media of claim 9 wherein the retrieved set of pre-defined CoGs is cached locally.

11. The non-transitory computer-readable medium or media of claim 9 wherein the specified system configuration comprises the set of components, versions, and associations between the set of components.

12. The non-transitory computer-readable medium or media of claim 9 wherein the generating CoG model data comprises retrieving data from a customer profile database and populating status of relationship data for connected components.

13. The non-transitory computer-readable medium or media of claim 9 wherein the model tree has a structure comprising a user, system, applied CoG, and component in the applied CoG.

14. The non-transitory computer-readable medium or media of claim 9 wherein the CoG instance is determined to be disqualified for evaluation when a mandatory field is not found for the CoG instance, wherein the CoG instance is determined to be qualified for evaluation when each mandatory field is found for the CoG instance.

15. The non-transitory computer-readable medium or media of claim 9 wherein:
responsive to the CoG instance fingerprint matching at least one CoG fingerprint from the set of pre-defined CoGs that represent valid configurations, the evaluation response designates the CoG instance as a valid configuration; and
responsive to the CoG instance fingerprint not matching any CoG fingerprint from the set of pre-defined CoGs that represent valid configurations, the evaluation response designates the CoG instance as an invalid configuration.

16. A system for interoperability service comprising:
one or more processors;
a user interface that receives a request for interoperability service for a specified system configuration comprising a set of components;
an element database that stores a plurality of component groups (CoGs) in which a CoG defines a set of fields of data related to a set of one or more components and one or more relationships between components;
a cache synchronizer coupled to the user interface and the element database, the cache synchronizer retrieving a set of pre-defined CoGs based on information of the a specified system configuration;
a CoG builder module that generates CoG model data comprising one or more CoG instances based on the specified system configuration;
a CoG qualifier that checks one or more relationships in CoG Model data and determines whether to qualify or disqualify each CoG instance for further evaluation;
a CoG evaluator that evaluates each CoG instance determined to be qualified for evaluation, the valuation comprising:
establishing a model tree for the CoG instance;
generating a CoG instance fingerprint based on the established model tree; and
iterating the set of pre-defined component groups to identity whether the CoG instance fingerprint matches at least one CoG fingerprint from the set of pre-defined CoGs; and
a response builder module that generates an evaluation response based on a result of the match identification.

17. The system of claim 16 wherein the specified system configuration comprises the set of components, versions, associations between the set of components.

18. The system of claim 16 wherein the generating CoG model data comprises retrieving data from a customer profile database and populating status of relationship data for connected components.

19. The system of claim 16 wherein the model tree has a structure comprising a user, system, applied CoG, and components in the applied CoG.

20. The system of claim 16 wherein the CoG instance is determined to be disqualified for evaluation when a mandatory field is not found for the CoG instance, wherein the CoG instance is determined to be qualified for evaluation when each mandatory field is found for the CoG instance.

* * * * *